(12) United States Patent
Kitamura et al.

(10) Patent No.: US 8,529,793 B2
(45) Date of Patent: Sep. 10, 2013

(54) GRANULAR STABILIZER FOR POLYMER AND PRODUCTION PROCESS THEREOF

(75) Inventors: Kazuhiro Kitamura, Osaka (JP); Natsuko Sato, Sakai (JP); Kenji Kimura, Funabashi (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/557,658

(22) Filed: Jul. 25, 2012

(65) Prior Publication Data

US 2012/0286212 A1 Nov. 15, 2012

Related U.S. Application Data

(62) Division of application No. 12/573,595, filed on Oct. 5, 2009, now abandoned.

(30) Foreign Application Priority Data

Oct. 6, 2008 (JP) .................................. 2008-259470
Dec. 22, 2008 (JP) .................................. 2008-325940
Dec. 22, 2008 (JP) .................................. 2008-325942

(51) Int. Cl.
*C09K 15/06* (2006.01)
*C09K 15/10* (2006.01)
*C07C 69/54* (2006.01)

(52) U.S. Cl.
USPC ........................... 252/406; 252/407; 560/140

(58) Field of Classification Search
USPC .................................. 252/406, 407; 560/140
See application file for complete search history.

(56) References Cited

U.S. PATENT DOCUMENTS

| | | | |
|---|---|---|---|
| 5,128,398 A | 7/1992 | Sasaki et al. | |
| 5,214,193 A | 5/1993 | Inoue et al. | |
| 5,240,642 A * | 8/1993 | Neri et al. ..................... | 252/399 |
| 5,281,646 A | 1/1994 | Yachigo et al. | |
| 6,126,863 A * | 10/2000 | Semen .......................... | 252/404 |
| 6,525,120 B2 | 2/2003 | Fukuda | |
| 6,526,120 B1 * | 2/2003 | Gray et al. ..................... | 378/57 |
| 6,740,694 B2 * | 5/2004 | Thibaut et al. ................. | 524/94 |
| 8,168,706 B2 | 5/2012 | Kitamura et al. | |
| 2001/0044518 A1 | 11/2001 | Hoffmann et al. | |
| 2007/0100045 A1 | 5/2007 | Kimura et al. | |
| 2009/0197997 A1 | 8/2009 | Kitamura et al. | |

FOREIGN PATENT DOCUMENTS

| | | |
|---|---|---|
| EP | 0 322 166 A1 | 6/1989 |
| EP | 0719824 A2 | 7/1996 |
| EP | 0719824 B1 | 7/1996 |
| EP | 0905180 A2 | 3/1999 |
| EP | 1 394 204 A1 | 3/2004 |
| EP | 2085423 A2 | 8/2009 |
| EP | 2 159 214 A2 | 3/2010 |
| JP | 63-027551 A | 2/1988 |
| JP | 1-168643 A | 7/1989 |
| JP | 4-264051 A | 9/1992 |
| JP | 7-64786 B2 | 7/1995 |
| JP | 09-169869 A | 6/1997 |
| JP | 2001-114953 A | 4/2001 |
| JP | 2001-302588 A | 10/2001 |
| JP | 2002-332359 A | 11/2002 |
| JP | 2003-171518 A | 6/2003 |
| KR | 10-0228558 B1 | 4/1993 |
| KR | 10-0376180 B1 | 7/1996 |
| KR | 10-2007-0046728 A | 5/2007 |
| KR | 10-2009-0084763 A | 5/2009 |
| WO | 94/07946 A1 | 4/1994 |
| WO | 94/07950 A1 | 4/1994 |

OTHER PUBLICATIONS

First Office Action, issued Apr. 25, 2012, from the Chinese Patent Office, in counterpart Chinese Patent Application No. 200910258466.0, along with an English translation thereof.
Office Action, mailed Jun. 5, 2012 from the Japanese Patent Office, in counterpart Japanese Patent Application No. 2008-325940, along with an English translation thereof.
Communication from the European Patent Office, dated Mar. 15, 2012, in counterpart European Patent Application No. 09 172 305.6-2102.
Communication, dated Oct. 25, 2012, issued in the European Patent Office, in corresponding European Patent Application No. 12181508.8-2102.
Second Office Action issued Oct. 18, 2012 from the Chinese Patent Office, in counterpart Chinese Patent Application No. 2009102584660.0, along with an English translation thereof.
Third Office Action issued May 16, 2013 from the Chinese Patent Office, in counterpart Chinese Patent Application No. 200910258466.0, with English translation.
Office Action issued Apr. 2, 2013 in counterpart Korean Patent Application No. 2012-0133980 to Sumitomo Chemical Co., Ltd., with translation.
Office Action issued Apr. 2, 2013 in counterpart Korean Patent Application No. 2009-0094310 to Sumitomo Chemical Co., Ltd. with translation.

\* cited by examiner

*Primary Examiner* — Tae H Yoon
(74) *Attorney, Agent, or Firm* — Sughrue Mion, PLLC

(57) ABSTRACT

The present invention provides a granular stabilizer for a polymer which is low-dusting and thus is easy to be handled. The present invention relates to a granular stabilizer for a polymer, comprising a compound shown by the formula (1):

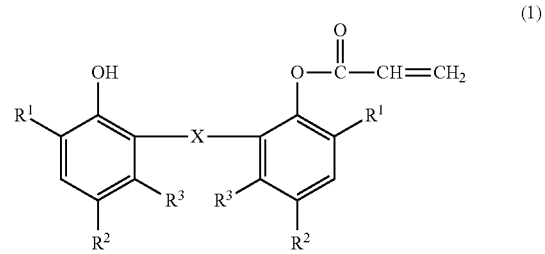

(1)

wherein $R^1$s and $R^2$s each independently represents a hydrogen atom, an alkyl group having 1 to 8 carbon atoms, or a cycloalkyl group having 5 to 8 carbon atoms; $R^3$s each independently represents a hydrogen atom or an alkyl group having 1 to 8 carbon atoms; and X represents a single bond, a sulfur atom, an oxygen atom, an alkylidene group having 1 to 8 carbon atoms or a cycloalkylidene group having 5 to 8 carbon atoms.

14 Claims, No Drawings

GRANULAR STABILIZER FOR POLYMER AND PRODUCTION PROCESS THEREOF

This is a divisional of application Ser. No. 12/573,595 filed Oct. 5, 2009, which claims priority to Japanese Application Nos. 2008-259470 filed Oct. 6, 2008, 2008-325940 filed Dec. 22, 2008, and 2008-325942 filed Dec. 22, 2008, the above-noted applications being incorporated herein by reference in their entirety.

BACKGROUND OF THE INVENTION

1. Field of the Invention

The present invention relates to granular stabilizers for a polymer and a production process thereof.

2. Description of the Related Art

As a stabilizer for a polymer, which stabilizes a polymer such as polybutadiene against heat and the like, 2-[1-(2-hydroxy-3,5-di-t-pentylphenyl)ethyl]-4,6-di-t-pentylphenyl acrylate (hereinafter referred to as "a compound (1-1)"), shown by the formula (1-1):

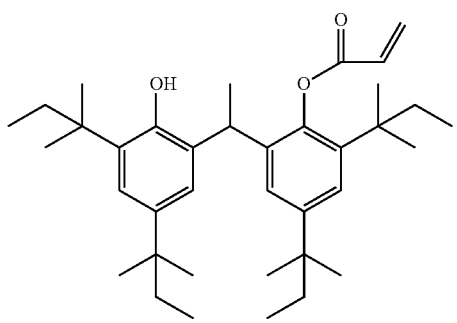

is known (see JP-A No. 1-168643).

As a process for producing polybutadiene blended with a stabilizer for a polymer, a process in which polymerization is performed in a hydrocarbon medium, and a solution comprising the polybutadiene after finishing the polymerization reaction is mixed with a solution of a stabilizer for a polymer in a hydrocarbon medium, followed by removal of the hydrocarbon medium, is generally adopted (see JP-A No. 1-168643).

Also, as a process for producing the compound of the formula (1-1), a process in which bisphenol and acrylic acid are reacted in an organic medium, and the reaction mass is washed with water and cooled to produce a crystal (see JP-A No. 1-168643), and a process in which the organic medium is distilled away by evaporation from the above-mentioned reaction mass, and methanol is added to the resulting mass to produce a crystal (see JP-A No. 4-264051) are disclosed.

SUMMARY OF THE INVENTION

The stabilizers for a polymer obtained by the processes described above, however, are powdery crystals, and therefore, they are difficult to be handled because of occurrence of dusting.

In order to solve the problem, the present inventors have made painstaking studies. As a result, they have reached the following inventions [1] to [19].

[1] A granular stabilizer for a polymer, comprising a compound shown by the formula (1):

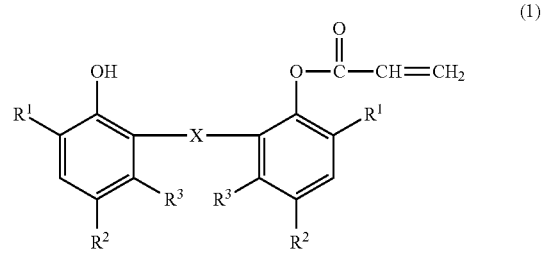

wherein $R^1$s and $R^2$s each independently represents a hydrogen atom, an alkyl group having 1 to 8 carbon atoms, or a cycloalkyl group having 5 to 8 carbon atoms; $R^3$s each independently represents a hydrogen atom or an alkyl group having 1 to 8 carbon atoms; and X represents a single bond, a sulfur atom, an oxygen atom, an alkylidene group having 1 to 8 carbon atoms or a cycloalkylidene group having 5 to 8 carbon atoms.

[2] The granular stabilizer for a polymer according to [1], wherein the granular stabilizer for a polymer has a weight of 1 mg to 25 mg per particle, preferably 5 mg to 25 mg per particle.

[3] The granular stabilizer for a polymer according to [1] or [2], wherein the compound shown by the formula (1) is 2-[1-(2-hydroxy-3,5-di-t-pentylphenyl)ethyl]-4,6-di-t-pentylphenyl acrylate or 2-t-butyl-6-(3-t-butyl-2-hydroxy-5-methylbenzyl)-4-methylphenyl acrylate.

[4] The granular stabilizer for a polymer according to [1] or [2], comprising 99.9 to 80% by weight of the compound shown by the formula (1) and 0.1 to 20% by weight of a compound shown by the formula (2) based on 100% by weight of the granular stabilizer for a polymer,

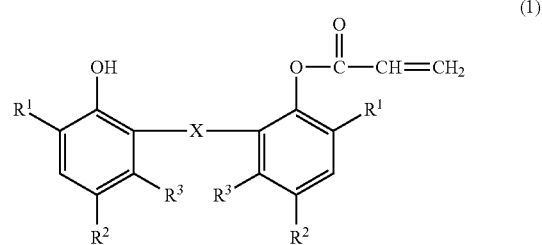

wherein $R^1$s and $R^2$s each independently represents a hydrogen atom, an alkyl group having 1 to 8 carbon atoms, or a cycloalkyl group having 5 to 8 carbon atoms; $R^3$s each independently represents a hydrogen atom or an alkyl group having 1 to 8 carbon atoms; and X represents a single bond, a sulfur atom, an oxygen atom, an alkylidene group having 1 to 8 carbon atoms or a cycloalkylidene group having 5 to 8 carbon atoms,

wherein $R^{11}$ is a linear alkyl group having 1 to 30 carbon atoms or a branched alkyl group having 3 to 60 carbon atoms, to the alkyl group may be bonded a hydroxyl group, a carboxyl group, an alkoxycarbonyl group having 2 to 30 carbon atoms, or an alkylcarbonyloxy group having 2 to 30 carbon atoms, and a methylene group contained in the alkyl group, the alkoxycarbonyl group and the alkylcarbonyloxy group may be substituted by a sulfur atom or an oxygen atom; and $R^{12}$ is a linear alkyl group having 1 to 30 carbon atoms, a branched alkyl group having 3 to 30 carbon atoms, or an aralkyl group having 7 to 20 carbon atoms, to the alkyl group or the aralkyl group may be bonded a hydroxyl group, a carboxyl group, an alkoxycarbonyl group having 2 to 30 carbon atoms or an alkylcarbonyloxy group having 2 to 30 carbon atoms, and methylene groups contained in the alkyl group, the aralkyl group, the alkoxycarbonyl group and the alkylcarbonyloxy group may be substituted by a sulfur atom or an oxygen atom.

[5] The granular stabilizer for a polymer according to [4], wherein the compound shown by the formula (2) is octadecyl-3-(4-hydroxy-3,5-di-t-butylphenyl)propionate, glycerin monostearate, dimyristyl-3,3'-thiodipropionate or distearyl-3,3'-thiodipropionate.

[6] The granular stabilizer for a polymer according to any one of [1] to [5], wherein the granular stabilizer for a polymer is in the shape of a circular disc, an approximate sphere or an approximate hemi-sphere.

[7] A process for producing a granular stabilizer for a polymer, comprising a compound shown by the formula (1):

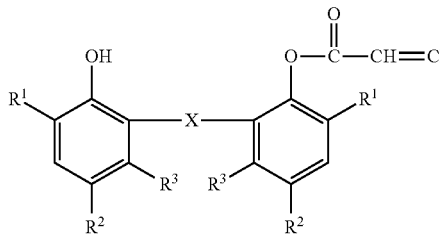

(1)

wherein $R^1$s and $R^2$s each independently represents a hydrogen atom, an alkyl group having 1 to 8 carbon atoms, or a cycloalkyl group having 5 to 8 carbon atoms; $R^3$s each independently represents a hydrogen atom or an alkyl group having 1 to 8 carbon atoms; and X represents a single bond, a sulfur atom, an oxygen atom, an alkylidene group having 1 to 8 carbon atoms or a cycloalkylidene group having 5 to 8 carbon atoms, wherein the process comprises:

a first step of melting the compound shown by the formula (1), which has a melting point of $T_m$° C.;

a second step of solidifying the molten material obtained in the first step at a temperature of $T_1$° C. wherein the $T_1$° C. is a temperature lower than $T_m$° C.; and a third step of heating the solidified material obtained in the second step under an atmosphere at a temperature of $T_2$° C. satisfying the formula (I):

$$T_1 < T_2 \leq T_m \quad (I)$$

[8] The process for producing a granular stabilizer for a polymer according to [7], wherein the molten material obtained in the first step is solidified at a temperature of $T_1$° C. satisfying the formula (II):

$$5 < T_1 < T_m - 40 \quad (II)$$

in the second step.

[9] The process for producing a granular stabilizer for a polymer according to [7] or [8], wherein the molten material obtained in the first step is dropped on a plate to be solidified in the second step.

[10] The process for producing a granular stabilizer for a polymer according to any one of [7] to [9], wherein the solidified material obtained in the second step is further heated under an atmosphere at a temperature of $T_2$° C. satisfying the formula (III):

$$T_m - 30 < T_2 \leq T_m \quad (III)$$

in the third step.

[11] The process for producing a granular stabilizer for a polymer according to any one of [7] to [10], further comprising a fourth step of cooling the heated material obtained in the third step at a temperature less than $T_2$° C.

[12] The process for producing a granular stabilizer for a polymer according to [11], wherein the heated material is cooled under an atmosphere at a temperature of $T_1$° C. satisfying the formula (II):

$$5 < T_1 < T_m - 40 \quad (II)$$

in the fourth step.

[13] A process for producing a granular stabilizer for a polymer, comprising a compound shown by the formula (1):

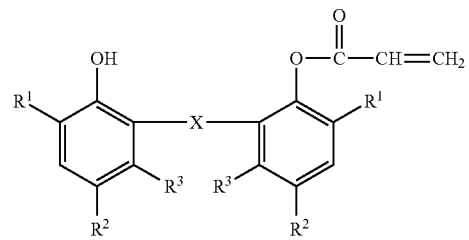

(1)

wherein $R^1$s and $R^2$s each independently represents a hydrogen atom, an alkyl group having 1 to 8 carbon atoms, or a cycloalkyl group having 5 to 8 carbon atoms; $R^3$s each independently represents a hydrogen atom or an alkyl group having 1 to 8 carbon atoms; and X represents a single bond, a sulfur atom, an oxygen atom, an alkylidene group having 1 to 8 carbon atoms or a cycloalkylidene group having 5 to 8 carbon atoms, wherein the process comprises:

a first step of melting the compound shown by the formula (1) having a melting point of $T_m$° C.;

a second step of forming the molten material obtained in the first step at a temperature of $T_1$° C. satisfying the formula (I):

$$T_1 < T_m \quad (I)$$

and a third step of mixing the formed material obtained in the second step with a solid compound shown by the formula (1) at a temperature lower than $T_m$° C.

[14] The process for producing a granular stabilizer for a polymer according to [13], wherein the molten material obtained in the first step is formed at a temperature of $T_1$° C. satisfying the formula (II):

$$T_m - 50 < T_1 < T_m \quad (II)$$

in the second step.

[15] The process for producing a granular stabilizer for a polymer according to [13] or [14], wherein, in the third step, the solid compound shown by the formula (1) is mixed in an amount of 1 to 20% by weight based on 100% by weight of the formed material obtained in the second step.

[16] The process for producing a granular stabilizer for a polymer according to any one of [13] to [15], further comprising a step of cooling the mixture obtained in the third step at a temperature of $T_2$ satisfying the formula (III):

$$5 < T_2 < T_1 - 30 \tag{III}$$

[17] The process for producing a granular stabilizer for a polymer according to any one of [7] to [16], wherein the compound shown by the formula (1) is 2-[1-(2-hydroxy-3,5-di-t-pentylphenyl)ethyl]-4,6-di-t-pentylphenyl acrylate or 2-t-butyl-6-(3-t-butyl-2-hydroxy-5-methylbenzyl)-4-methylphenyl acrylate.

[18] Use of the granular stabilizer for a polymer according to any one of [1] to [6] for thermally stabilizing a thermoplastic polymer.

[19] A thermoplastic polymer composition, comprising 0.01 to 2 parts by weight of the granular stabilizer for a polymer according to any one of [1] to [6] based on 100 parts by weight of a thermoplastic polymer.

The granular stabilizer for a polymer of the invention is low-dusting and is therefore easy to be handled.

DETAILED DESCRIPTION OF THE INVENTION

The granular stabilizer for a polymer of the invention comprises a compound shown by the formula (1):

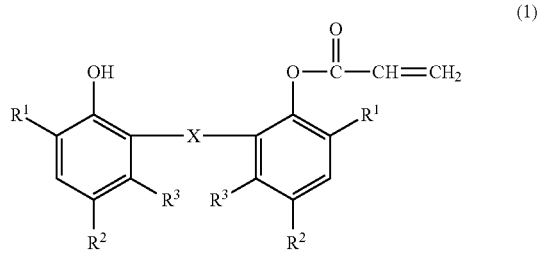

(1)

(hereinafter sometimes referred to as "a compound (1)").

In the formula (1), $R^1$s and $R^2$s each independently represents a hydrogen atom, an alkyl group having 1 to 8 carbon atoms, or a cycloalkyl group having 5 to 8 carbon atoms. Here, examples of the alkyl group include a methyl group, an ethyl group, an n-propyl group, an i-propyl group, an n-butyl group, an i-butyl group, a t-butyl group, an n-pentyl group, an i-pentyl group, a t-pentyl group, a 2-ethylhexyl group, and the like. Examples of the cycloalkyl group include a cyclopentyl group, a cyclohexyl group, a cyclooctyl group, 3-methylcyclopentyl group, a 4-methylcyclopentyl group, a 3-methylcyclohexyl group, and the like.

$R^3$s each independently represents a hydrogen atom or an alkyl group having 1 to 8 carbon atoms. Specific examples of the alkyl group in $R^3$ include the alkyl groups exemplified in $R^1$.

X represents a single bond, a sulfur atom, an oxygen atom, an alkylidene group having 1 to 8 carbon atoms, or a cycloalkylidene group having 5 to 8 carbon atoms.

Here, examples of the alkylidene group include a methylene group, an ethylidene group, a propylidene group, a butylidene group, and the like. Examples of the cycloalkylidene group include a cyclopentylidene group, a cyclohexylidene group, and the like.

The compound (1) has a melting point of usually 70 to 220° C., and preferably 100 to 140° C.

Examples of the compound (1) include 2-[1-(2-hydroxy-3,5-di-t-pentylphenyl)ethyl]-4,6-di-t-pentylphenyl acrylate, 2-[1-(2-hydroxy-3,5-di-t-pentylphenyl)ethyl]-4,6-di-t-pentylphenyl methacrylate, 2-(2-hydroxy-3,5-di-t-pentylbenzyl)-4,6-di-t-pentylphenyl acrylate, 2,4-di-t-butyl-6-[1-(3,5-di-t-butyl-2-hydroxyphenyl)ethyl]phenyl acrylate, 2,4-di-t-butyl-6-(3,5-di-t-butyl-2-hydroxybenzyl)phenyl acrylate, 2,4-di-t-butyl-6-[1-(3,5-di-t-butyl-2-hydroxyphenyl)ethyl]phenyl methacrylate, 2-t-butyl-6-(3-t-butyl-2-hydroxy-5-methylbenzyl)-4-methylphenyl acrylate, 2-t-butyl-6-[1-(3-t-butyl-2-hydroxy-5-methylphenyl)ethyl]-4-methylphenyl acrylate, 2-t-butyl-6-(3-t-butyl-2-hydroxy-5-methylbenzyl)-4-methylphenyl methacrylate, 2-t-butyl-6-[1-(3-t-butyl-2-hydroxy-5-methylphenyl)propyl]-4-methylphenyl acrylate, 2-t-butyl-6-(3-t-butyl-5-ethyl-2-hydroxybenzyl)-4-ethylphenyl acrylate, 2-t-butyl-6-[1-(3-t-butyl-2-hydroxy-5-propylphenyl)ethyl]-4-propylphenyl acrylate, 2-t-butyl-6-[1-(3-t-butyl-2-hydroxy-5-isopropylphenyl)ethyl]-4-isopropyl phenyl acrylate, and the like.

Preferable examples thereof include 2-[1-(2-hydroxy-3,5-di-t-pentylphenyl)ethyl]-4,6-di-t-pentylphenyl acrylate, 2-t-butyl-6-(3-t-butyl-2-hydroxy-5-methylbenzyl)-4-methylphenyl acrylate, 2,4-di-t-butyl-6-[1-(3,5-di-t-butyl-2-hydroxyphenyl)ethyl]phenyl acrylate, 2-t-butyl-6-[1-(3-t-butyl-2-hydroxy-5-methylphenyl)ethyl]-4-methylphenyl acrylate, 2-t-butyl-6-[1-(3-t-butyl-2-hydroxy-5-methylphenyl)propyl]-4-methylphenyl acrylate, 2-t-butyl-6-[1-(3-t-butyl-2-hydroxy-5-propylphenyl)ethyl]-4-propylphenyl acrylate, 2-t-butyl-6-[1-(3-t-butyl-2-hydroxy-5-isopropylphenyl)ethyl]-4-isopropylphenyl acrylate, and the like.

Particularly preferable examples include 2-[1-(2-hydroxy-3,5-di-t-pentylphenyl)ethyl]-4,6-di-t-pentylphenyl acrylate and 2-t-butyl-6-(3-t-butyl 2-hydroxy-5-methylbenzyl)-4-methylphenyl acrylate.

The compound (1) can be produced according to a process described in, for example, JP-A Nos. 59-144733, 1-168643 or 4-264051, U.S. Pat. Nos. 4,525,514, 4,562,281 and 4,365,032, or the like.

The compound (1) may be used as a mixture of multiple different kinds of the compounds (1).

The granular stabilizer for a polymer of the invention comprises the compound (1).

In one embodiment of the invention, the granular stabilizer for a polymer comprises usually 95% by weight or more, preferably 99% by weight or more of the compound (1), and particularly preferably, the stabilizer comprises the compound (1) alone.

In another embodiments of the invention, the granular stabilizer for a polymer comprises a compound shown by the formula (2):

(2)

(hereinafter sometimes referred to as "a compound (2)") in addition to the compound (1).

In the formula (2), $R^{11}$ is a linear alkyl group having 1 to 30 carbon atoms such as a methyl group, an ethyl group, an n-propyl group, an n-butyl group, an n-pentyl group, an n-octadecyl group or an n-tetradecyl group; or a branched alkyl group having 3 to 30 carbon atoms such as an i-propyl group, an i-butyl group, a t-butyl group, an i-pentyl group, a t-pentyl group or a 2-ethylhexyl group.

A hydroxyl group, a carboxyl group, an alkoxycarbonyl group having 2 to 30 carbon atoms or an alkylcarbonyloxy group having 2 to 30 carbon atoms may be bonded to the alkyl group. Also, the methylene group contained in the alkyl group, the alkoxycarbonyl group and the alkylcarbonyloxy group may be substituted by a sulfur atom or an oxygen atom.

Examples of the $R^{11}$ include a group shown by the following formula:

in addition to the alkyl groups as described above.

Examples of $R^{12}$ include a linear alkyl group having 1 to 30 carbon atoms such as a methyl group, an ethyl group, an n-propyl group, an n-butyl group, an n-pentyl group, an n-octadecyl group or an n-tetradecyl group; a branched alkyl group having 3 to 30 carbon atoms such as an i-propyl group, an i-butyl group, a t-butyl group, an i-pentyl group, a t-pentyl group or a 2-ethylhexyl group; or an aralkyl group having 7 to 20 carbon atoms such as a benzyl group, a phenylethyl group or a phenylpropyl group.

A hydroxyl group, a carboxyl group, an alkoxycarbonyl group having 2 to 30 carbon atoms, or an alkylcarbonyloxy group having 2 to 30 carbon atoms may be bonded to the alkyl group and the aralkyl group. Also, the methylene group contained in the alkyl group may be substituted by a sulfur atom or an oxygen atom. Examples of $R^{12}$ include a 2,3-di-hydroxypropyloxy group, $-CH_2CH_2SCH_2CH_2COOC_{12}H_{25}$, $-CH_2CH_2SCH_2CH_2COOC_{14}H_{29}$, $-CH_2CH_2SCH_2CH_2COOC_{18}H_{37}$, an aralkyl group shown by the following formula:

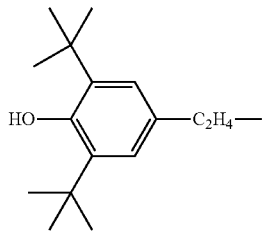

and the like.

The compound (2) has preferably a melting point lower than that of the compound (1). The compound (2) having a melting point lower than that of the compound (1) is preferable because the resulting granular stabilizer for a polymer is difficult to cause blocking upon transportation or storage thereof; in other words, the resulting stabilizer has good antiblocking properties.

The compound (2) having a melting point of 30° C. or more is preferable, because the resulting granular stabilizer for a polymer has good form stability. The compounds (2) having a melting point of not less than 40° C. and less than 80° C., especially not less than 45° C. and less than 70° C., are particularly preferable.

The preferable compound (2) is particularly at least one compound selected from the group consisting of phenol antioxidants, sulfur antioxidants and antistatic agents.

Examples of the compound (2) include phenol antioxidants such as octadecyl-3-(4-hydroxy-3,5-di-t-butylphenyl)propionate (melting point: 50 to 55° C., Irganox 1076, which is a registered trademark of Ciba Specialty Chemicals); sulfur antioxidants such as dilauryl-3,3'-thiodipropionate (melting point: 40 to 42° C.), dimyristyl-3,3'-thiodipropionate (melting point: 49 to 54° C.), distearyl-3,3'-thiodipropionate (melting point: 65 to 67° C.), and tetrakis(3-dodecylthiopropionic acid)pentaerythrityl ester (melting point: about 46° C.); and antistatic agents such as glycerin monostearate (melting point: 65 to 70° C.), glycerin monocaprate (melting point: 46° C.), glycerin monolaurate (melting point: 57° C.), and citric acid fatty acid monoglyceride (melting point: 59° C.); and the like.

The compound (2) may be used as a mixture of multiple different kinds of the compounds (2).

The preferable compound (2) is particularly octadecyl-3-(4-hydroxy-3,5-di-t-butylphenyl)propionate, glycerin monostearate, dimyristyl-3,3'-thiodipropionate and distearyl-3,3'-thiodipropionate, especially octadecyl-3-(4-hydroxy-3,5-di-t-butylphenyl)propionate.

In an embodiment in which the granular stabilizer for a polymer of the invention comprises the compound (2), the granular stabilizer for a polymer comprises the compound (1) in an amount of preferably 99.9 to 80% by weight, more preferably 99.7 to 90% by weight, and particularly preferably 99.5 to 95% by weight, based on 100% by weight of the granular stabilizer for a polymer.

Also, the stabilizer comprises the compound (2) in an amount of preferably 0.1 to 20% by weight, more preferably 0.3 to 10% by weight, and particularly preferably 0.5 to 5% by weight, based on 100% by weight of the granular stabilizer for a polymer.

As a process for producing the granular stabilizer for a polymer of the invention, examples thereof include a process comprising a first step of melting the compound (1) having a melting point of $T_m°$ C.; a second step of solidifying the molten material obtained in the first step at a temperature of $T_1°$ C. in which $T_1°$ C. is a temperature less than $T_m°$ C.; and a third step of heating the solidified material obtained in the second step under an atmosphere at a temperature of $T_2°$ C. satisfying the formula (I):

$$T_1 < T_2 \leq T_m \quad \text{(I)}.$$

The first step is a step of melting the compound (1). Specifically, the compound (1) is heated at a temperature of a melting point of the compound (1), $T_m°$ C., or more to melt it. The temperature at which the compound (1) is heated to melt it is not particularly limited so long as the temperature is $T_m°$ C. or more, and the temperature range is preferably from $T_m°$ C. to $(T_m+50)°$ C., more preferably from $(T_m+5)°$ C. to $(T_m+40)°$ C., and particularly preferably from $(T_m+10)°$ C. to $(T_m+30)°$ C.

The second step is a step of solidifying (cooling) the molten material obtained in the first step at a temperature of $T_1°$ C. in which $T_1°$ C. is a temperature less than $T_m°$ C.

Preferably, the solidifying temperature, $T_1°$ C. is within a range shown by the formula (II):

$$5 < T_1 < T_m - 40 \quad \text{(II)}.$$

More preferably, the solidifying temperature, $T_1°$ C. is within a range shown by the formula (II)':

$$10 < T_1 < T_m - 50 \quad \text{(II)}'.$$

The solidifying temperature more than 5° C. is preferable because the crystallization is easily promoted when the solidified material is reheated in the subsequent third step, whereas the solidifying temperatures less than $(T_m-40)°$ C. are also preferable because the shape can be retained upon solidification. The solidifying time is not particularly limited, and the temperature is preferably kept for 1 minute or more, and particularly preferably for 2 minutes or more immediately after the temperature reaches the above-mentioned temperature range. The solidifying time is preferably 24 hours or less from the viewpoint of productivity.

The solidification methods are not particularly limited, and include, for example, a method in which a molten compound (1) is sprayed or dropped on a plate (preferably a heat-exchangeable plate made of a metal such as stainless steel) which is cooled to, preferably, a predetermined temperature ($T_1°$ C.), thereby cooling and solidifying the molten compound (1) in the shape of a sphere or approximate hemisphere; a method in which a molten compound (1) is connectively extruded onto a belt which is cooled to, preferably, a predetermined temperature ($T_1°$ C.), thereby cooling and solidifying the molten compound (1) in the shape of a bar, plate or the like; and the like.

The plate on which the molten compound (1) is sprayed or dropped is usually a heat-exchangeable plate which is cooled to a temperature of about 0 to 60° C., and the plate includes stainless steel belts cooled with water or the like, stainless steel belts cooled with cool air or the like, stainless steel plates cooled with water or the like, stainless steel plates cooled with cool air or the like, and the like.

The surface of the plate on which the molten material is dropped is usually flat and smooth.

When the belt is used as the plate, the molten material may be cooled while moving the belt, and when the solidification is performed on a stationary plate, the solidified material may be taken out from the plate after the solidification.

Examples of the method for spraying or dropping the molten compound (1) specifically include methods in which the molten compound (1) is dropped, for example, through a dropping tube, methods in which the molten compound (1) is filled in a Rolldrop granulator, a Rotoform granulator or the like, and then the compound is dropped, and the like.

The Rolldrop granulators refer to granulators having usually a rotating drum with protrusions, and a mechanism in which a molten material is scraped by the tips of the protrusions, and the molten material scraped is dropped on a plate with centrifugal force obtained by rotation of the rotating drum and/or force of gravity.

The Rotoform granulators refer to granulators having usually a cylindrical part with holes, a molten material being held inside of the cylindrical part, and having a mechanism in which the molten material is dropped from the holes on the plate.

It is particularly preferable to drop the molten material by using the Rotoform granulators.

The belts used for connectively extruding the molten compound (1) are preferably belts composed of a metal heat exchangeable plate such as a stainless steel plate, which is cooled to a predetermined temperature ($T_1°$ C.), and include specifically stainless steel belts cooled with water or the like, stainless steel belts cooled with cool air or the like, and the like.

The methods for connectively extruding the molten compound (1) include specifically methods in which the compound is extruded through a strip former into a bar, or methods in which the compound is extruded through a double roll feeder or an overflow feeder into a plate, and the like.

The extruded material in the shape of a bar, plate or the like can be granulated as described below.

In the second step, the dropped material or connectively extruded material is usually cooled and solidified on the plate, and at that time, crystals of the compound (1), and the like may be added thereto as seed crystals to solidify it.

When the belt is used as the plate, the molten material may be cooled while moving the belt, and when the solidification is performed on a stationary plate, the solidified material may be taken out from the plate after the solidification.

The third step is a step of heating the solidified material obtained in the second step under an atmosphere at a temperature of $T_2°$ C. satisfying the formula (I):

$$T_1 < T_2 \leq T_m \quad (I).$$

When the solidified material is reheated within such a temperature range, the crystallization can be caused in a short time, thus resulting in obtaining a stabilizer which does not cause blocking.

As the phenomenon causes more easily, the reheating temperature, $T_2$ preferably satisfies the formula (III):

$$T_m - 30 < T_2 \leq T_m \quad (III),$$

more preferably satisfies the formula (III)':

$$T_m - 20 < T_2 \leq T_m - 5 \quad (III)'.$$

Also, with respect to the reheating time, the solidified material obtained in the second step may be heated so long as it does not flow, and the reheating time is preferably not less than 1 minute and within 10 hours.

The time is more preferably from not less than 2 minutes and within 5 hours, because the solidified material can be crystallized in a short time, and the time is further more preferably from not less than 5 minutes and within 30 minutes from the viewpoint of productivity.

The reheating may be performed by using the same metal plate or belt such as the stainless steel plate or belt as used in the second step, or may be performed by using a metal plate or belt separately prepared. Also, when the spherical or hemispherical compound (1) is reheated, it is preferably reheated so that the particles are not contacted with each other, from the viewpoint of blocking. The shape which has been given upon cooling can be maintained in this manner.

The process for producing the granular stabilizer for a polymer of the invention comprises a fourth step of cooling the heated material obtained in the third step at a temperature less than $T_2°$ C., as occasion demands.

The cooling temperature, $T_1°$ C. in the fourth step is preferably within a range shown by the formula (II):

$$5 < T_1 < T_m - 40 \quad (II)$$

The cooling temperature, $T_1°$ C. is more preferably within a range shown by the formula (II)'

$$10 < T_1 < T_m - 50 \quad (II)'.$$

The cooling temperature more than 5° C. is preferable from the viewpoint of productivity, and the cooling temperature less than $(T_m - 40)°$ C. is also preferable because the shape can be maintained when it is cooled. The cooling time is not particularly limited, and the temperature is preferably kept for 1 minute or more immediately after the temperature reaches the above-mentioned temperature range from the viewpoint of formation of a shape.

In the second step, when the molten compound (1) is connectively extruded into a bar, plate or the like, and it is cooled and solidified, the bar, plate or the like is pulverized in a known method before, during or after the third step or the fourth step and if necessary the obtained particles are size-selected, whereby desired particles can be made.

Examples of the method for pulverizing the bar, plate or the like specifically include a method for pulverizing it with a rotating roller using a breaker roller, and the like.

Examples of the size-selection method include, for example, a method in which the bar is cut into flakes through a strip granulator, a method in which the plate is pulverized through a breaker roller to give irregularly-shaped pieces and they are passed through a sieve, and the like.

In another embodiment of the invention, the process for producing the granular stabilizer for a polymer of the invention comprises: a first step of melting a compound (1) having a melting point of $T_m$° C.; a second step of forming the molten material obtained in the first step at a temperature of $T_1$° C. satisfying the formula (I):

$$T_1 < T_m \qquad (I)$$

and a third step of mixing the formed material obtained in the second step with a solid compound (1) at a temperature less than $T_m$° C.

The first step is a step of melting the compound (1). Specifically, the compound (1) is heated at a temperature of a melting point of compound (1), $T_m$° C. or more to melt the compound (1). The temperature at which the compound (1) is heated and molten is not particularly limited so long as the temperature is $T_m$° C. or more, and the temperature is preferably within a range of $T_m$° C. to $(T_m+50)$° C., more preferably $(T_m+5)$° C. to $(T_m+40)$° C., particularly preferably $(T_m+10)$° C. to $(T_m+30)$° C.

The second step is a step of forming the molten material obtained in the first step at a temperature of $T_1$° C. satisfying the formula (I):

$$T_1 < T_m \qquad (I).$$

The forming temperature, $T_1$° C. is preferably within a range shown by the formula (II);

$$T_m - 50 < T_1 < T_m \qquad (II).$$

The forming temperature, $T_1$° C. is more preferably within a range shown by the formula (II)':

$$T_m - 40 < T_1 < T_m \qquad (II)'.$$

The forming temperature more than $(T_m-50)$° C. is preferable because the crystallization can be easily promoted, and the forming temperature less than $T_m$° C. is also preferable because the formed shape can be maintained.

The time during which the molten material is maintained at the forming temperature is preferably not less than 1 minute and within 1 hour, and more preferably not less than 1 minute and within 30 minutes. From the viewpoints of promotion of subsequent crystallization and efficiency of productivity, the time is further more preferably not less than 2 minutes and within 30 minutes.

The forming methods are not particularly limited, and include, for example, a method in which a molten compound (1) is sprayed or dropped on a plate (preferably a heat-exchangeable plate made of a metal such as stainless steel) which is cooled to, preferably, a predetermined temperature ($T_1$° C.), thereby cooling and solidifying the molten compound (1) in the shape of a particle such as a sphere or approximate hemisphere; a method in which a molten compound (1) is connectively extruded onto a belt which is cooled to, preferably, a predetermined temperature ($T_1$° C.), thereby cooling and solidifying the molten compound (1) in the shape of a bar, plate or the like to form; and the like.

The plate on which the molten compound (1) is sprayed or dropped is usually a heat-exchangeable plate which is cooled to a temperature of about 0 to 60° C., and the plate includes stainless steel belts cooled with water or the like, stainless steel belts cooled with cool air or the like, stainless steel plates cooled with water or the like, stainless steel plates cooled with cool air or the like, and the like.

The surface of the plate on which the molten material is dropped is usually flat and smooth.

When the belt is used as the plate, the molten material may be cooled while moving the belt, and when the solidification is performed on a stationary plate, the solidified material may be taken out from the plate after the solidification.

Examples of the method for spraying or dropping the molten compound (1) specifically include methods in which the molten compound (1) is dropped, for example, through a dropping tube, methods in which the molten compound (1) is filled in a Rolldrop granulator, a Rotoform granulator or the like, and then the compound is dropped, and the like.

The Rolldrop granulators refer to granulators having usually a rotating drum with protrusions, and a mechanism in which a molten material is scrapped by the tips of the protrusions, and the molten material scraped is dropped on a plate with centrifugal force obtained by rotation of the rotating drum and/or force of gravity.

The Rotoform granulators refer to granulators having usually a cylindrical part with holes, a molten material being held inside of the cylindrical part, and having a mechanism in which the molten material is dropped from the holes on the plate.

It is particularly preferable to drop the molten material by using the Rotoform granulators.

The belts used for connectively extruding the molten compound (1) are preferably belts composed of a metal heat exchangeable plate such as a stainless steel plate, which is cooled to a predetermined temperature ($T_1$° C.), and include specifically stainless steel belts cooled with water or the like, stainless steel belts cooled with cool air or the like, and the like.

The methods for connectively extruding the molten compound (1) include specifically methods in which the compound is extruded through a strip former into a bar, or methods in which the compound is extruded through a double roll feeder or an overflow feeder into a plate, and the like.

The extruded materials in the shape of a bar, plate or the like can be granulated as described below.

The third step is a step of mixing the formed material obtained in the second step with the solid compound (1) at a temperature of less than $T_m$° C., preferably $T_1$° C. or less.

The methods for mixing the formed material obtained in the second step with the solid compound (1) are not particularly limited, and include, for example, a method in which the solid compound (1) is placed on the metal plate or belt, to which the formed material obtained by dropping the molten material is added, and they are mixed; a method in which the solid compound (1) is placed on the metal plate or belt, to which the formed material obtained by extruding the molten material is added; a method in which the solid compound (1) is sprinkled over the formed material obtained by dropping or connectively extruding the molten material; a method in which any of the above-mentioned procedures are simultaneously performed; and the like.

The mixing in the third step of the invention also includes a case in which the formed material is brought into contact with the solid compound (1), as illustrated above, and this contacting method is particularly preferable.

The solid compound (1) used in the third step includes, for example, crystalline powder of compound (1), particularly powder having an endotherm peak at 110 to 130° C. when the temperature is elevated at a rate of 10° C./minute in a differential scanning calorimeter (DSC), and having an average particle size of 10 μm to 100 μm. Specifically, compounds (1) described in JP-A Nos. 1-168643, 4-264051, and the like, and commercially available compounds (1) (for example, Sumilizer (registered trademark) GM, GS (Sumitomo Chemical Co., Ltd.), and the like) may be directly used.

The average particle size referred herein means a 50% particle size (median size) when a particle seize distribution measured by using a laser diffraction particle size distribution measuring device is integrated from the finer particle side in terms of a volume.

In the third step, the solid compound (1) is mixed with the formed material obtained in the second step in an amount of preferably 1 to 20% by weight, and more preferably 5 to 10% by weight, based on 100% by weight of the formed material. The amount of the solid compound (1) of 5% by weight or more is preferable, because the crystallization is promoted, and the amount of 10% by weight or less is also preferable because dusting tends to be inhibited.

When there is a solid compound (1) which was not contained in the mixture of the formed material obtained in the third step and the solid compound (1), the occurrence of dusting can be inhibited by removing the solid compound from the system by using a sieve, or the like.

Further, the mixture obtained in the third step is preferably treated in a step in which the mixture is cooled at a temperature ($T_2$) less than $T_1$° C. (hereinafter sometimes referred to as "a cooling step"). The cooling temperature, $T_2$° C. in the cooling step is preferably within a range shown by the formula (III):

$$5 < T_2 < T_1 - 30 \quad (III).$$

The cooling temperature, $T_2$° C. is more preferably within the range shown by the formula (III)':

$$10 < T_2 < T_1 - 40 \quad (III)'.$$

The cooling temperature more than 5° C. of is preferable from the viewpoint of productivity, and the cooling temperature less than ($T_1$−30)° C. is also preferable because the shape can be maintained upon cooling. The cooling time is not particularly limited, and it is preferable to keep the temperature for 1 hour or more immediately after the temperature reaches the above-mentioned temperature range from the viewpoint of formation of a shape.

In the second step, when the molten compound (1) is connectively extruded to form a bar, plate or the like, the bar, plate or the like is pulverized in a known method before, during or after the third step and if necessary the obtained particles are size-selected, whereby desired particles can be made.

Examples of the method for pulverizing the bar, plate or the like specifically include a method for pulverizing it with a rotating roller using a breaker roller, and the like.

Examples of the method for size-selecting include, for example, a method in which the bar is cut into flakes through a strip granulator, a method in which the plate is pulverized through a breaker roller to give irregularly-shaped pieces and they are passed through a sieve, and the like.

In an embodiment in which the granular stabilizer for a polymer of the invention comprises the compound (2), the process for producing the granular stabilizer for a polymer of the invention includes, for example, a process comprising a melting step in which 99.9 to 80% by weight of the compound (1) and 0.1 to 20% by weight of the compound (2), based on 100% by weight of the composition are melted; and a forming step in which the molten material obtained in the melting step is solidified to give particles, and the like.

The specific melting step includes, for example, a method in which the compound (1) and the compound (2) are mixed in the weight ratio described above in a vessel, the mixture is heated to a temperature equal to or more than the melting point of the compound (1), specifically about 120° C. to about 160° C., and stirred it to melt it; a method in which the compound (1) and the compound (2) are previously mixed through a Banbury mixer, and the like before they are added in a vessel, and then they are molten; a method in which the compound (2) having a lower melting point is previously heated and stirred to melt it, to which the compound (1) is added, and they are molten, and the like.

For the forming step, a method in which the molten material obtained in the melting step is sprayed or dropped in the shape of a droplet on, for example, a board, preferably a heat exchangeable plate such as a stainless steel plate, which can be cooled, and the like can be adopted.

Specifically, examples of the method include a method in which the molten material obtained in the melting step is dropped, for example, from a dropping tube, a step in which the molten material is filled in a Rolldrop granulator, a Rotoform granulator or the like, and then it is dropped therefrom, and the like.

Here, the Rolldrop granulators refer to granulators having usually a rotating drum with protrusions, and a mechanism in which a molten material is scraped by the tips of the protrusions, and the molten material scraped is dropped on a plate with centrifugal force obtained by rotation of the rotating drum and/or force of gravity.

The Rotoform granulators refer to granulators having usually a cylindrical part with holes, a molten material being held inside of the cylindrical part, and having a mechanism in which the molten material is dropped from the holes on the plate.

It is particularly preferable to drop the molten material by using the Rotoform granulators.

The plate is usually a heat-exchangeable plate which is cooled to a temperature of about 0 to 60° C., and the plate includes stainless steel belts cooled with water or the like, stainless steel belts cooled with cool air or the like, stainless steel plates cooled with water or the like, stainless steel plates cooled with cool air or the like, and the like.

The surface of the plate on which the molten material is dropped is usually flat and smooth.

When the belt is used as the plate, the molten material may be cooled while moving the belt, and when the solidification is performed on a stationary plate, the solidified material may be taken out from the plate after the solidification.

In the present invention, the granular composition usually can be obtained as a granular composition having an endotherm peak within a temperature range of (a melting point of the compound (1)±10° C.) in a short time such as about 10 seconds to 10 minutes after cooling.

The granular stabilizers for a polymer of the invention are particles in the shape of a plate, a flake, a bar, a disc, an approximate sphere, an approximate hemisphere, or the like. The granular stabilizers for a polymer in the shape of a disc, an approximate sphere or an approximate hemisphere can be obtained by dropping the molten material comprising compound (1). When the particle size is small, spherical particles are obtained, and when the size is larger, hemispherical particles are obtained because the molten material becomes flat due to its own weight.

When the granular stabilizers for a polymer are in the shape of a sphere, the particle size is usually from 1 mm to 5 mm, and when the stabilizers are in the shape of an approximate hemisphere, the particle size is from 1 mm to 4 mm, and the height is from 1 mm to 4 mm. From the viewpoint of dispersibility in a thermoplastic polymer, when the stabilizers are in the shape of a sphere, the particle size is preferably from 1 mm to 4 mm, and when the stabilizers are in the shape of an approximate hemisphere, the particle size is preferably from 2 mm to 4 mm and the height is preferably from 1 mm to 3 mm.

The granular stabilizers for a polymer of the invention have a weight of one particle of the granular stabilizer for a polymer of, for example 1 mg to 25 mg, preferably 5 mg to 25 mg, and more preferably 6 mg to 20 mg.

The weights within the above-mentioned range are preferable, because dusting is inhibited, and there is a tendency that the particles are difficult to agglomerate with each other.

To control the weight of the granular stabilizer for a polymer, when the molten material is dropped using the dropping tube in the solidification step, an amount of the dropping molten material may be adjusted by adjusting a size of holes, a viscosity of the molten material, and the like, when the Rolldrop granulator is used, an amount of the molten material scrapped by the tips of the protrusions may be adjusted, and when the Rotoform granulator is used, the amount of the dropping molten material may be controlled by adjusting a size of holes, a viscosity of the molten material, and the like.

When the molten material is connectively extruded in the solidification step, the extruded, solidified material in the shape of a plate or bar may be cut or pulverized so that the pieces are within the above-mentioned weight range.

The granular stabilizers for a polymer of the invention are crystalline particles. That is, the granular stabilizers for a polymer of the invention have an endotherm peak at a range of, preferably (a melting point of the compound (1)±10° C.) when the temperature is elevated at a rate of 10° C./minute in a differential scanning calorimeter (DSC), more preferably, they have an endotherm peak within a range of 110 to 140° C.

The granular stabilizers for a polymer of the invention are low-dusting, and easy to be handled. The stabilizers can be dissolved in a hydrocarbon medium such as pentane, hexane, cyclopentane, or cyclohexane while dusting hardly occurs, and then the solution may be added to a thermoplastic polymer. In addition, even if the stabilizers are stored for a long period of time, blocking (agglomeration) does not occur, in other words, blocking resistance is good.

Further, when the granular stabilizer for a polymer of the invention is added to a thermoplastic polymer such as polypropylene during melt-kneading, the granular stabilizer for a polymer exhibits excellent dispersibility like conventional powdery granular stabilizers for a polymer, even if the granular stabilizer is in the shape of a particle. The dispersibilities of the compound (1) and the compound (2) if present in the obtained thermoplastic polymer composition are almost the same as the dispersibilities thereof in a thermoplastic polymer composition comprising the powdery compound (1) or a thermoplastic polymer composition obtained by separately adding the compound (1) and the compound (2) to a thermoplastic polymer and melt-kneading the mixture.

Here, examples of the thermoplastic polymer include polypropylene resins such as an ethylene-propylene copolymer, polyethylene resins (high density polyethylene (HD-PE), low density polyethylene (LD-PE), linear low density polyethylene (LLDPE), and the like), a methylpentene polymer, an ethylene-ethyl acrylate copolymer, an ethylene-vinyl acetate copolymer, polystyrenes (polystyrene such as poly(p-methyl styrene) or poly(α-methyl styrene), an acrylonitrile-styrene copolymer, an acrylonitrile-butadiene-styrene copolymer, a special acrylic rubber-acrylonitrile-styrene copolymer, an acrylonitrile-chlorinated polyethylene-styrene copolymer, a styrene-butadiene copolymer, and the like), chlorinated polyethylene, polychloroprene, a chlorinated rubber, polyvinyl chloride, polyvinylidene chloride, a methacrylic resin, an ethylene-vinyl alcohol copolymer, a fluorocarbon resin, polyacetal, a grafted polyphenylene-ether resin, a polyphenylene-sulfide resin, polyurethane, polyamide, polyester resins (for example, polyethylene terephthalate, polybutyrene terephthalate, and the like), polycarbonate, polyacrylate, polysulfone, polyether ether ketone, polyether sulfone, an aromatic polyester resin, a di-allylphthalate prepolymer, a silicone resin, 1,2-polybutadiene, polyisoprene, a butadiene/acrylonitrile copolymer, an ethylene-methyl methacrylate copolymer, and the like. Among these, the polyethylene resins, polypropylene resins and polystyrenes are particularly preferable because of their good forming processability, and the polypropylene resins, acrylonitrile-butadiene-styrene copolymers and styrene-butadiene copolymers are especially preferable.

Here, the polypropylene resin means a polyolefin containing a structural unit derived from propylene, and specifically includes a crystalline propylene homopolymer, a propylene-ethylene random copolymer, a propylene-α-olefin random copolymer, a propylene-ethylene-α-olefin copolymer, and a polypropylene block copolymer composed of a propylene homopolymer component or a copolymer component mainly comprising propylene and a copolymer compound of propylene, and ethylene and/or α-olefin, and the like.

In the present invention, when a polypropylene resin is used as the thermoplastic polymer, the polypropylene resin may be used alone or as a mixture of two or more kinds thereof.

The α-olefin refers to usually an α-olefin having 4 to 12 carbon atoms, and includes, for example, 1-butene, 1-pentene, 1-hexene, 4-methyl-1-pentene, 1-octene, 1-decene, and the like, and 1-butene, 1-hexene and 1-octene are more preferable.

The propylene-α-olefin random copolymer includes, for example, a propylene-1-butene random copolymer, a propylene-1-hexene random copolymer, a propylene-1-octene random copolymer, and the like.

The propylene-ethylene-α-olefin copolymer includes, for example, a propylene-ethylene-1-butene copolymer, a propylene-ethylene-1-hexene copolymer, a propylene-ethylene-1-octene copolymer, and the like.

In the polypropylene block copolymer composed of a propylene homopolymer component or a copolymer component mainly comprising propylene, and a copolymer component of propylene, and ethylene and/or α-olefin, the copolymer component mainly comprising propylene includes, for example, a propylene-ethylene copolymer component, a propylene-1-butene copolymer component, and a propylene-1-hexene copolymer component; and the copolymer component of propylene, and ethylene and/or α-olefin includes, for example, a propylene-ethylene copolymer component, a propylene-ethylene-1-butene copolymer component, a propylene-ethylene-1-hexene copolymer component, a propylene-ethylene-1-octene copolymer component, a propylene-1-butene copolymer component, a propylene-1-hexene copolymer component, a propylene-1-octene copolymer component, and the like. The content of the ethylene and/or the α-olefin having 4 to 12 carbon atoms in the copolymer component of propylene, and ethylene and/or α-olefin is usually from 0.01 to 20% by weight.

The polypropylene block copolymer composed of a propylene homopolymer component or a copolymer component mainly comprising propylene and a copolymer component comprising propylene, and ethylene and/or α-olefin includes, for example, a propylene-ethylene block copolymer, a (propylene)(propylene-ethylene) block copolymer, a (propylene) propylene-ethylene-1-butene) block copolymer, a (propylene)-(propylene-ethylene-1-hexene) block copolymer, a (propylene)-(propylene-1-butene) block copolymer, a (propylene)-(propylene-1-hexene) block copolymer, a (propylene-ethylene)propylene-ethylene-1-butene) block copolymer, a (propylene-ethylene)-(propylene-ethylene-1-hexene) block copolymer, a (propylene-ethylene)propylene-1-butene) block copolymer, a (propylene-ethylene)-(propylene-1-hexene) block copolymer, a (propylene-1-butene)propylene-ethylene) block copolymer, a (propylene-1-butene) propylene-ethylene-1-butene) block copolymer, a (propylene-1-butene)-(propylene-ethylene-1-hexene) block copolymer, a (propylene-1-butene)propylene-1-butene) block copolymer, a (propylene-1-butene)-(propylene-1-hexene) block copolymer, and the like.

In the present invention, when the polypropylene resin is used as the thermoplastic polymer, the crystalline propylene homopolymer, and the polypropylene block copolymer composed of a propylene homopolymer component or a copolymer component mainly comprising propylene, and a copolymer component comprising propylene, and ethylene and/or α-olefin having 4 to 12 carbon atoms are preferable. The polypropylene block copolymer composed of a propylene homopolymer component or a copolymer component mainly comprising propylene, and a copolymer component comprising propylene, and ethylene and/or α-olefin having 4 to 12 carbon atoms is more preferable.

The granular stabilizer for a polymer of the invention usually may be blended with the thermoplastic polymer in an amount of 2 parts by weight or less based on 100 parts by weight of the thermoplastic polymer. Specifically, the stabilizer may be blended with the thermoplastic polymer in an amount of not less than 0.01 part by weight and not more than 2 parts by weight, preferably not less than 0.01 part by weight and not more than 1 part by weight. Preferably the amount is 2 parts by weight or less, because a bleeding phenomenon in which the stabilizer is bled on the surface of the thermoplastic polymer composition desirably tends to be inhibited.

Example

The present invention will be described in more detail by means of Examples and Comparative Examples, but the present invention is not limited thereto.

In the following examples and comparative examples, as a compound (1), 2-[1-(2-hydroxy-3,5-di-t-pentylphenyl) ethyl]-4,6-di-t-pentylphenyl acrylate (hereinafter referred to as "a compound (1-1)". melting point: 119° C.) was used. As a compound (2), glycerin monostearate (hereinafter sometimes referred to as "a compound (i)", an antistatic agent having a melting point of 65 to 70° C.), dimyristyl-3,3'-thiodipropionate (hereinafter sometimes referred to as "a compound (ii)", a sulfur antioxidant having a melting point of 49 to 54° C.), distearyl-3,3'-thiodipropionate (hereinafter sometimes referred to as "a compound (iii)", a sulfur antioxidant having a melting point of 65 to 67° C.) or octadecyl-3-(4-hydroxy-3,5-di-t-butylphenyl)propionate (hereinafter sometimes referred to as "a compound (iv)", a phenol antioxidant, Irganox 1076 which is a registered trademark of Ciba Specialty Chemicals, having a melting point of 55° C.).

The properties of granular stabilizers for a polymer were measured and evaluated as follows:
(Blocking Resistance Test)

A granular stabilizer for a polymer, 50 g was weighed, and it was put in a cylindrical case having a cross-sectional area of 28.3 cm$^2$ to which a 2 kg of weight was put (71 g/cm$^2$). The case was maintained in a thermostatic chamber at 40° C. under a moisture of 80% for 7 days as it was, and then it was returned to room temperature (about 25° C.). After the pressure was removed from the case, the blocking state of the granular stabilizer for a polymer was evaluated.

Good: The granular stabilizer for a polymer was not agglomerated, and it spontaneously returned to the original state when it was taken out from the case.
Poor: The granular stabilizer for a polymer was agglomerated, and it did not returned to the original state.
(Method for Measuring Particle Size)

The obtained granular stabilizer for a polymer was measured with a slide caliper, and the scale on the jaw part in the horizontal direction was read as a particle size and the scale in the vertical direction was read as a height. The same measurement procedure was repeated 10 times per each sample, and the average values are defined as a particle size (width) and a height.
(Method for Measuring Weight of One Particle of Granular Stabilizer for Polymer)

One particle of the obtained granular stabilizer for a polymer was measured by using a precision balance manufactured by Mettler-Toledo International Inc. The same measurement was repeated 20 times per each sample, and the average value was defined as a weight of one particle of the granular stabilizer for a polymer.
(Differential Scanning Calorimetric Analysis)

The temperature of the granular stabilizer for a polymer was elevated at a rate of 10° C./minutes and an endotherm peak (° C.) was measured by using a differential scanning calorimeter (DSC) (DSC-60A manufactured by Shimadzu Corporation).

Comparative Example 1

A four-neck flask equipped with a thermometer, a stirrer, and a condenser was charged with 494.8 g (1.0 mole) of 2,2'-ethylidenebis(4,6-di-t-pentylphenol), 72.1 g (1.0 mole) of acrylic acid, 400 g of n-heptane, and 212.5 g (2.1 moles) of triethyl amine, and the inside of the vessel was replaced by nitrogen. Then, 107.3 g (0.7 mole) of phosphorous oxychloride was added dropwise to the vessel, while the mixture was stirred. After the addition was finished, the mixture was kept at 80° C. for 1 hour, and then, 500 g of water was added thereto, and it was washed with water at 60° C. and was separated into two layers. The oil layer part was repeatedly washed with water and separated until the layer became neutral, and the oil layer was cooled to 5° C. with stirring to precipitate crystals. The stirring was further continued at the same temperature, and after the crystals were precipitated, the crystals were filtered, washed with cool n-heptane, dried under reduced pressure to give 235.6 g of a white crystalline powdery compound (1-1) having a melting point of 119° C. The obtained powder had an average particle size (median size: 50% particle size when a particle size distribution measured by using a Shimadzu laser diffraction particle size distribution measuring device SALD2200, using an ion exchanged water mixed with a slight amount of a neutral detergent as a dispersion medium, was integrated from the finer particle side in terms of a volume) of 65.0 μm. The obtained powder had a weight of one particle of <1.0 mg, and an endotherm peak at 120.5° C. The result of the blocking resistance test of the powder is shown in Table 1. Also, the powder was extremely dusting.

Example 1

The powdery compound (1-1) obtained in Comparative Example 1 was heated and stirred in a vessel until the temperature reached 140° C. to melt the compound, and then the molten compound (1-1) was dropped on an aluminum plate having a temperature of 25° C., which was cooled to 50° C. to give a solidified material. The solidified material was kept at about 25° C. for 1.5 hours, and then was heated again in a dryer having a temperature of 110° C. for 5 minutes. The compound was taken out from the dryer and cooled to 25° C. again to give 2-[1-(2-hydroxy-3,5-di-t-pentylphenyl)ethyl]-4,6-di-t-pentylphenyl acrylate in the shape of an approximate hemisphere having a particle size of 3.3 mm and a height of 2 mm. The obtained granular stabilizer for a polymer had a weight of one particle of 16.2 mg, and an endotherm peak at 120.5° C. The result of the blocking resistance test of the granular stabilizer for a polymer is shown in Table 1. The granular stabilizer for a polymer was not dusting, and was easy to be handled.

Reference Example 1

The molten compound (1-1) was obtained in the same manner as in Example 1. Then, the molten compound (1-1) was dropped onto an aluminum plate having a temperature of 25° C., which was cooled at room temperature (about 25° C.) until the molten material was solidified to give 513.3 g of a compound (1-1) having a particle size of 3.6 mm and a height of 2.2 mm. The obtained granular stabilizer for a polymer had a weight of one particle of 15.5 mg and it had an endotherm peak at 20.6° C., which was derived from a glass transition temperature, but did not have an endotherm peak at 120° C. The result of the blocking resistance test of the granular stabilizer for a polymer is shown in Table 1. The granular stabilizer for a polymer was not dusting, and was easy to be handled.

TABLE 1

| | Particle size/height (mm) | Weight (mg/particle) | Endotherm peak (° C.) | Blocking resistance |
|---|---|---|---|---|
| Example 1 | 3.3/2 | 16.2 | 120.5 | Good |
| Comparative Example 1 | 65.0 μm* | <1.0 | 120.5 | Good |
| Reference Example 1 | 3.6/2.2 | 15.5 | 20.6 | Poor |

*Median size according to laser diffraction particle size distribution measurement Example 2

The compound (1-1) obtained in Comparative Example 1 was heated and stirred at 140° C. to give a molten compound (1-1). After that, the molten material was dropped on an aluminum plate on which the compound (1-1) obtained in Comparative Example 1 was placed under an atmosphere of 110° C., over which 54.9 g of the compound (1-1) obtained in Comparative Example 1 was sprinkled. Subsequently, it was kept at 110° C. for 5 minutes, and cooled it at room temperature (about 25° C.) to give a compound (1-1) in the shape of an approximate hemisphere having a particle size of 3.5 mm and a height of 2.3 mm. The obtained granular stabilizer for a polymer had a weight of one particle of 15.9 mg, and an endotherm peak at 120.5° C. Then, the blocking resistance test was performed. The compound was not dusting after the production, and was easy to be handled.

Example 3

The procedure was performed in the same manner as in Example 2 except that the amount of the compound (1-1) obtained in Comparative Example 1 which was sprinkled over the molten compound (1-1) was changed to 27.5 g to give approximately hemispherical particles having a particle size of 3.3 mm and a height of 2.1 mm. The obtained granular stabilizer for a polymer had a weight of one particle of 17.3 mg, and an endotherm peak at 120.5° C. The results of the dusting and the block resistance are shown in Table 2.

Example 4

The procedure was performed in the same manner as in Example 2 except that the amount of the compound (1-1) obtained in Comparative Example 1 which was sprinkled over the molten compound (1-1) was changed to 5.5 g to give approximately hemispherical particles having a particle size of 3.3 mm and a height of 2.1 mm. The obtained granular stabilizer for a polymer had a weight of one particle of 16.8 mg, and an endotherm peak at 120.5° C. The results of the dusting and the block resistance are shown in Table 2.

Reference Example 2

The procedure was performed in the same manner as in Example 2 except that the compound (1-1) obtained in Comparative Example 1 which was sprinkled over the molten compound (1-1) was not added to give an approximately hemispherical particles having a particle size of 3.2 mm and a height of 2.0 mm. The particles, however, were very soft, and a small amount of deposits on the aluminum plate were observed. The obtained granular stabilizer for a polymer had a weight of one particle of 15.9 mg, and had an endotherm peak at 20.6° C., which derived from the grass transition temperature, but does not have an endotherm peak approximately at 120° C. The results of the dusting and the block resistance are shown in Table 2.

Reference Example 3

The procedure was performed in the same manner as in Example 2 except that the compound (1-1) obtained in Comparative Example 1 was not added to the molten compound (1-1), but the molten compound (1-1) which was obtained by heating and stirring at 140° C. was dropped under an atmosphere of 25° C., and then was cooled to give approximate hemispherical particles having a particle size of 3.2 mm and a height of 2.1 mm. The particles, however, were very soft, and a small amount of deposits on the aluminum plate were observed. The obtained granular stabilizer for a polymer had a weight of one particle of 14.5 mg, and had an endotherm peak at 20.6° C., which derived from the grass transition temperature, but does not have an endotherm peak approximately at 120° C. The results of the dusting and the block resistance are shown in Table 2.

TABLE 2

| | Amount of the crystalline powdery compound (1-1) added (parts by weight)* | Dusting | Blocking resistance |
|---|---|---|---|
| Example 2 | 10 | Good | Very good |
| Example 3 | 5 | Good | Very Good |

TABLE 2-continued

| | Amount of the crystalline powdery compound (1-1) added (parts by weight)* | Dusting | Blocking resistance |
|---|---|---|---|
| Example 4 | 1 | Good | Good |
| Comparative Example 1 | — | Heavy dusting | Very good |
| Reference Example 2 | — | Good | Poor |
| Reference Example 3 | — | Good | Poor |

*Based on 100 parts by weight of the compound (1-1) in a solution

Example 5

Melting Step: A melting tank was charged with the compound (1) and the compound (iv) in a weight ratio of 10:1, and the mixture was heated at 145° C. to give a molten material.

Forming Step The molten material obtained in the above step was dropped on a stainless steel plated which was cooled with cooling water having a temperature of 30° C. to give approximately hemispherical granular stabilizer for a polymer having an average particle size of 5.0 mm, an average height of 1.5 mm, and an average particle weight of 13.6 mg (granular composition a). The granular composition a was not dusting.

The particle size, weight and endotherm peak (DSC analysis) of this granular composition were measured according to the above-mentioned methods.

Example 6

A granular stabilizer for a polymer (granular composition b) was obtained in the same manner as in Example 5 except that the weight ratio of the compound (1) and the compound (iv) were mixed in a weight ratio of 100:1. The results are summarized in Table 3. The granular composition b showed an endotherm peak at 120° C. according to DSC.

TABLE 3

| | Example 5 | Example 6 |
|---|---|---|
| Granular composition in the shape of a particle | a | b |
| Particle size/height (mm) | 5.0/1.5 | 3.2/2.0 |
| Weight of one particle (mg) | 13.6 | 15.4 |
| Dusting | Not observed | Not observed |
| Anti-blocking properties* | Good | Good |

*Anti-blocking properties

About 10 particles of the obtained granular composition was applied with a load of 73.6 g/cm² in a constant temperature and moisture chamber having a temperature of 40° C. and a moisture of 80% RH, which was allowed to stand for one week. The state was visually observed, and confirmed whether the particles of the granular composition agglomerated with each other or not.

Good: There was no agglomeration.

Somewhat poor: The agglomeration which was collapsed with an impact was observed.

Poor: Melting or heavy agglomeration, which was not collapsed even if impact was applied thereto, was observed.

Example 7

A granular composition can be obtained in the same manner as in Example 6 except that the compound (i) is used as a compound (2).

Example 8

A granular composition can be obtained in the same manner as in Example 6 except that the compound (ii) is used as a compound (2).

Example 9

A granular composition can be obtained in the same manner as in Example 6 except that the compound (iii) is used as a compound (2).

INDUSTRIAL APPLICABILITY

The granular stabilizer for a polymer of the present invention is low-dusting and therefore is easy to be handled.

What is claimed is:

1. A process for producing a granular stabilizer for a polymer, comprising a compound shown by the formula (1):

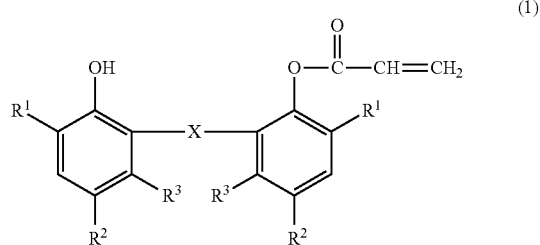

wherein $R^1$s and $R^2$s each independently represents a hydrogen atom, an alkyl group having 1 to 8 carbon atoms, or a cycloalkyl group having 5 to 8 carbon atoms; $R^3$s each independently represents a hydrogen atom or an alkyl group having 1 to 8 carbon atoms; and X represents a single bond, a sulfur atom, an oxygen atom, an alkylidene group having 1 to 8 carbon atoms or a cycloalkylidene group having 5 to 8 carbon atoms, wherein the process comprises:
  a first step of melting the compound shown by the formula (1), which has a melting point of $T_m$ ° C.;
  a second step of solidifying the molten material obtained in the first step at a temperature of $T_1$ ° C. wherein the $T_1$ ° C. is a temperature lower than $T_m$ ° C.; and
  a third step of heating the solidified material obtained in the second step under an atmosphere at a temperature of $T_2$ ° C. satisfying the formula (III):

$$T_m - 30 < T_2 \leq T_m \quad \text{(III)}$$

2. The process for producing a granular stabilizer for a polymer according to claim 1, further comprising compound shown by the formula (2):

wherein $R^{11}$ is a linear alkyl group having 1 to 30 carbon atoms or a branched alkyl group having 3 to 60 carbon atoms, to the alkyl group may be bonded a hydroxyl group, a carboxyl group, an alkoxycarbonyl group having 2 to 30 carbon atoms, or an alkylcarbonyloxy group having 2 to 30 carbon atoms, and a methylene group contained in the alkyl group, the alkoxycarbonyl group and the alkylcarbonyloxy group may be substituted by a sulfur atom or an oxygen atom; and $R^{12}$ is a linear alkyl group having 1 to 30 carbon atoms, a branched alkyl group having 3 to 30 carbon atoms, or an aralkyl group having 7 to 20 carbon atoms, to the alkyl group or the aralkyl group may be bonded a hydroxyl group, a carboxyl group, an alkoxycarbonyl group having 2 to 30 carbon atoms or an alkylcarbonyloxy group having 2 to 30 carbon atoms, and methylene groups contained in the alkyl group, the aralkyl group, the alkoxycarbonyl group and the alkylcarbonyloxy group may be substituted by a sulfur atom or an oxygen atom, wherein the compound shown by formula (2) has a melting point lower than that of the compound shown by formula (1) and is melted in the first step with the compound shown by formula (1).

3. The process for producing a granular stabilizer for a polymer according to claim 1, wherein the molten material obtained in the first step is solidified at a temperature of $T_1°$ C. satisfying the formula (II):

$$5<T_1<T_m-40 \tag{II}$$

in the second step.

4. The process for producing a granular stabilizer for a polymer according to claim 1, wherein the molten material obtained in the first step is dropped on a plate to be solidified in the second step.

5. The process for producing a granular stabilizer for a polymer according to claim 1, further comprising a fourth step of cooling the heated material obtained in the third step at a temperature less than $T_2°$ C.

6. The process for producing a granular stabilizer for a polymer according to claim 5, wherein the heated material is cooled under an atmosphere at a temperature of $T_1°$ C. satisfying the formula (II):

$$5<T_1<T_m-40 \tag{II}$$

in the fourth step.

7. The process for producing a granular stabilizer for a polymer according to claim 1, wherein the compound shown by the formula (1) is 2-[1-(2-hydroxy-3,5-di-t-pentylphenyl) ethyl]-4,6-di-t-pentylphenyl acrylate or 2-t-butyl-6-(3-t-butyl-2-hydroxy-5-methylbenzyl)-4-methylphenyl acrylate.

8. A process for producing a granular stabilizer for a polymer, comprising a compound shown by the formula (1):

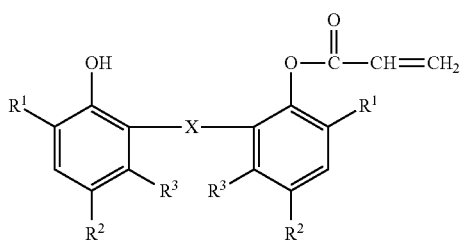

wherein $R^1$s and $R^2$s each independently represents a hydrogen atom, an alkyl group having 1 to 8 carbon atoms, or a cycloalkyl group having 5 to 8 carbon atoms; $R^3$s each independently represents a hydrogen atom or an alkyl group having 1 to 8 carbon atoms; and X represents a single bond, a sulfur atom, an oxygen atom, an alkylidene group having 1 to 8 carbon atoms or a cycloalkylidene group having 5 to 8 carbon atoms, wherein the process comprises:

a first step of melting the compound shown by the formula (1) having a melting point of $T_m°$ C.;

a second step of forming the molten material obtained in the first step at a temperature of $T_1°$ C. satisfying the formula (I):

$$T_1<T_m \tag{I}$$

and a third step of mixing the formed material obtained in the second step with the solid compound shown by the formula (1) at a temperature lower than $T_m°$ C.

9. The process for producing a granular stabilizer for a polymer according to claim 8, wherein the molten material obtained in the first step is formed at a temperature of $T_1°$ C. satisfying the formula (II):

$$T_m-50<T_1<T_m \tag{II}$$

in the second step.

10. The process for producing a granular stabilizer for a polymer according to claim 8, wherein, in the third step, the solid compound shown by the formula (1) is mixed in an amount of 1 to 20% by weight based on 100% by weight of the formed material obtained in the second step.

11. The process for producing a granular stabilizer for a polymer according to claim 8, further comprising a step of cooling the mixture obtained in the third step at a temperature of $T_2$ satisfying the formula (III):

$$5<T_2<T_1-30 \tag{III}.$$

12. The process for producing a granular stabilizer for a polymer according to claim 8, wherein the compound shown by the formula (1) is 2-[1-(2-hydroxy-3,5-di-t-pentylphenyl) ethyl]-4,6-di-t-pentylphenyl acrylate or 2-t-butyl-6-(3-t-butyl-2-hydroxy-5-methylbenzyl)-4-methylphenyl acrylate.

13. The process for producing a granular stabilizer for a polymer according to claim 10, further comprising compound shown by the formula (2):

wherein $R^{11}$ is a linear alkyl group having 1 to 30 carbon atoms or a branched alkyl group having 3 to 60 carbon atoms, to the alkyl group may be bonded a hydroxyl group, a carboxyl group, an alkoxycarbonyl group having 2 to 30 carbon atoms, or an alkylcarbonyloxy group having 2 to 30 carbon atoms, and a methylene group contained in the alkyl group, the alkoxycarbonyl group and the alkylcarbonyloxy group may be substituted by a sulfur atom or an oxygen atom; and $R^{12}$ is a linear alkyl group having 1 to 30 carbon atoms, a branched alkyl group having 3 to 30 carbon atoms, or an aralkyl group having 7 to 20 carbon atoms, to the alkyl group or the aralkyl group may be bonded a hydroxyl group, a carboxyl group, an alkoxycarbonyl group having 2 to 30 carbon atoms or an alkylcarbonyloxy group having 2 to 30 carbon atoms, and methylene groups contained in the alkyl group, the aralkyl group, the alkoxycarbonyl group and the alkylcarbonyloxy group may be substituted by a sulfur atom or an oxygen atom, wherein the compound shown by formula (2) is melted in the first step with the compound shown by formula (1).

14. The process for producing a granular stabilizer for a polymer according to claim 13, wherein the compound shown by the formula (2) has a melting point lower than that of the compound shown by formula (1).

* * * * *